US008319600B2

(12) United States Patent
Hsieh

(10) Patent No.: US 8,319,600 B2
(45) Date of Patent: Nov. 27, 2012

(54) MONITORING SYSTEM AND INPUT DEVICE THEREOF

(75) Inventor: Ming-Chih Hsieh, Taipei Hsien (TW)

(73) Assignee: Hon Hai Precision Industry Co., Ltd., Tu-Cheng, New Taipei (TW)

( * ) Notice: Subject to any disclaimer, the term of this patent is extended or adjusted under 35 U.S.C. 154(b) by 421 days.

(21) Appl. No.: 12/781,927

(22) Filed: May 18, 2010

(65) Prior Publication Data

US 2011/0175721 A1 Jul. 21, 2011

(30) Foreign Application Priority Data

Jan. 16, 2010 (CN) .......................... 2010 1 0300369

(51) Int. Cl.
*G05B 23/02* (2006.01)

(52) U.S. Cl. ................... 340/3.1; 340/425.5; 340/426.1; 340/539.22; 324/713

(58) Field of Classification Search ................... 340/3.1, 340/425.5, 426.1, 539.22; 324/713
See application file for complete search history.

(56) References Cited

U.S. PATENT DOCUMENTS

| | | | | |
|---|---|---|---|---|
| 4,455,453 | A * | 6/1984 | Parasekvakos et al. | 340/3.3 |
| 5,652,566 | A * | 7/1997 | Lambert | 340/507 |
| 7,447,612 | B2 * | 11/2008 | Keyes et al. | 340/3.1 |
| 7,889,105 | B2 * | 2/2011 | Zushi et al. | 341/120 |
| 8,227,934 | B2 * | 7/2012 | Hsieh | 340/425.5 |
| 2003/0016128 | A1 * | 1/2003 | Lutz et al. | 340/517 |
| 2006/0234526 | A1 * | 10/2006 | Garrels et al. | 439/76.1 |

* cited by examiner

*Primary Examiner* — Eric M Blount

(74) *Attorney, Agent, or Firm* — Altis Law Group, Inc.

(57) ABSTRACT

A monitoring system includes a controller, a number of input devices, a number of first sensors, a number of second sensors, and a number of alarms. Each input device comprises a switching circuit, an input circuit, and a connector. The connector is connected to a first sensor and a voltage source in series or connected to a second sensor and a current source in series. The controller controls the switching circuit of the input device to receive a voltage signal of the first sensor or a current signal of the second sensor and send out a corresponding detection signal. The input circuit transmits the detection signal to the controller. The controller controls the corresponding alarm to work according to the detection signal.

12 Claims, 4 Drawing Sheets

MONITORING SYSTEM AND INPUT DEVICE THEREOF

CROSS-REFERENCE

Relevant subject matter is disclosed in six co-pending U.S. patent application Ser. Nos. 12/641,230, 12/781,933, 12/770,779, 12/781,940, 12/781,951, and 12/781,954 assigned to the same assignee as this patent application.

BACKGROUND

1. Technical Field

The present disclosure relates to monitoring systems and, particularly, to a monitoring system with input devices.

2. Description of Related Art

Most monitoring systems are designed to monitor certain conditions such as temperature or pressure changes. The number of conditions may be limited and as such the number of input devices or sensors are fixed. Further, some input devices are integrated into the monitoring system. As a result, it is inconvenient to modify such a monitoring system to expand its input capability.

BRIEF DESCRIPTION OF THE DRAWINGS

Many aspects of the present embodiments can be better understood with reference to the following drawings. The components in the drawings are not necessarily drawn to scale, the emphasis instead being placed upon clearly illustrating the principles of the present embodiments. Moreover, in the drawings, all the views are schematic, and like reference numerals designate corresponding parts throughout the several views.

DETAILED DESCRIPTION

The disclosure is illustrated by way of example and not by way of limitation in the figures of the accompanying drawings in which like references indicate similar elements. It should be noted that references to "an" or "one" embodiment in this disclosure are not necessarily to the same embodiment, and such references mean at least one.

Figure 1:
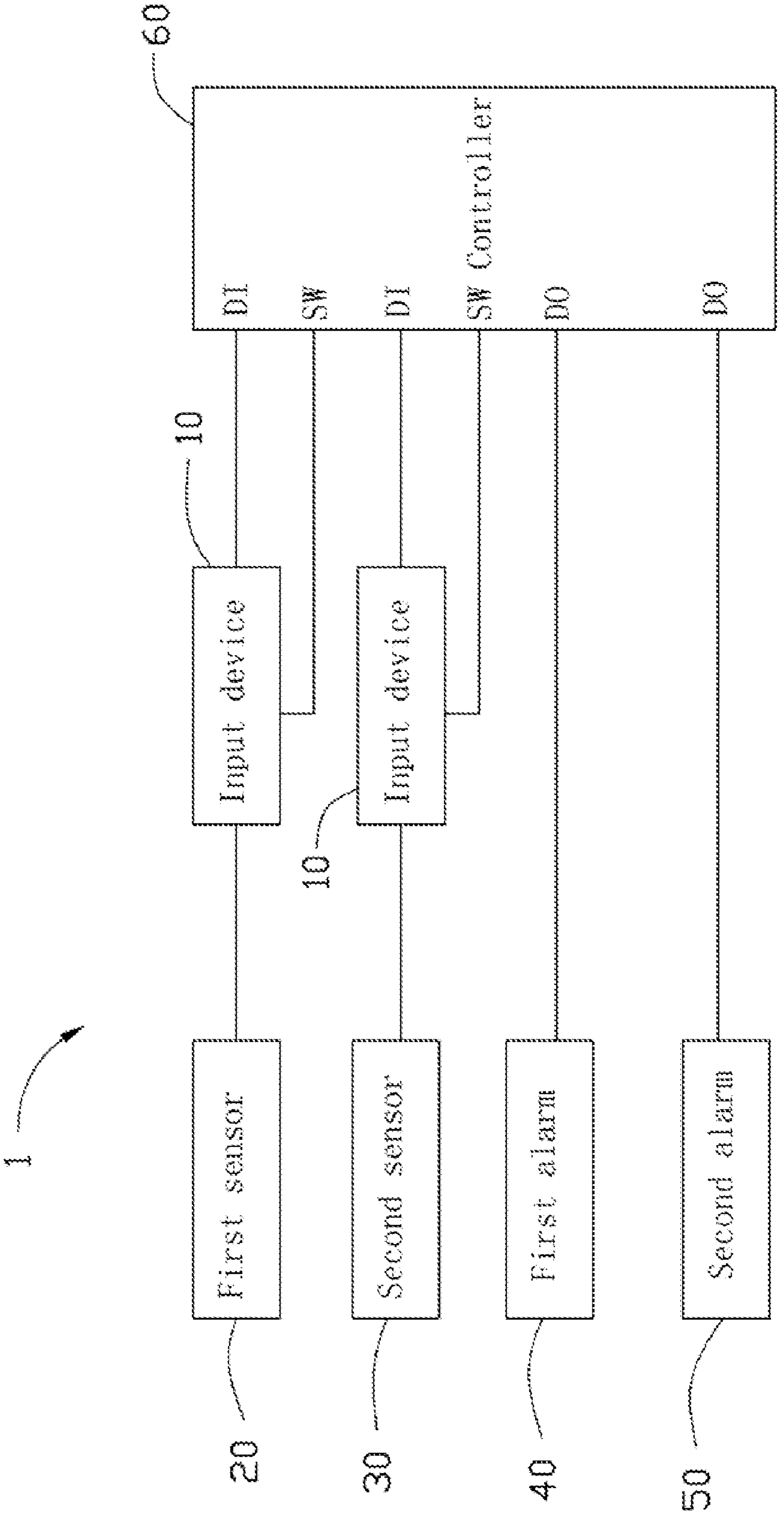
FIG. 1 is a schematic block diagram of an exemplary embodiment of a monitoring system, the monitoring system including input devices.

Referring to FIG. 1, an exemplary embodiment of a monitoring system 1 includes two input devices 10, a first sensor 20, a second sensor 30, a first alarm 40, a second alarm 50, and a controller 60. In another embodiment, the monitoring system 1 may include a plurality of input devices 10, a plurality of first sensors 20, a plurality of second sensors 30, a plurality of first alarms 40, a plurality of second alarms 50, and a controller 60. A sum of the first sensors 20 and the second sensors 30 is equal to the number of the input devices 10. There is one first alarm 40 for each first sensor 20, and one second alarm 50 for each second sensor 30. In the embodiment, the first and second sensors 20, 30 are temperature sensors.

The controller 60 includes two input terminals DI, two output terminals DO, and two control terminals SW.

Each input device 10 is connected between the first sensor 30 or the second sensor 40, and one of the input terminals D1 of the controller 60. Each input device 10 is also connected to one of the control terminals SW of the controller 60. The first alarms 40 and the second alarms 50 are respectively connected to the output terminals DO of the controller 60.

When an input device 10 is connected to the first sensor 20, the input device 10 converts a voltage signal from the first sensor 20 to a first detection signal and transmits the first detection signal to the controller 60. When an input device 10 is connected to the second sensor 30, the input device 10 converts a current signal of the second sensor 30 to a second detection signal and transmits the second detection signal to the controller 60. The controller 60 controls the corresponding first alarm 40 to work according to the first detection signal. The controller 60 controls the corresponding second alarm 50 to work according to the second detection signal.

Figure 2:
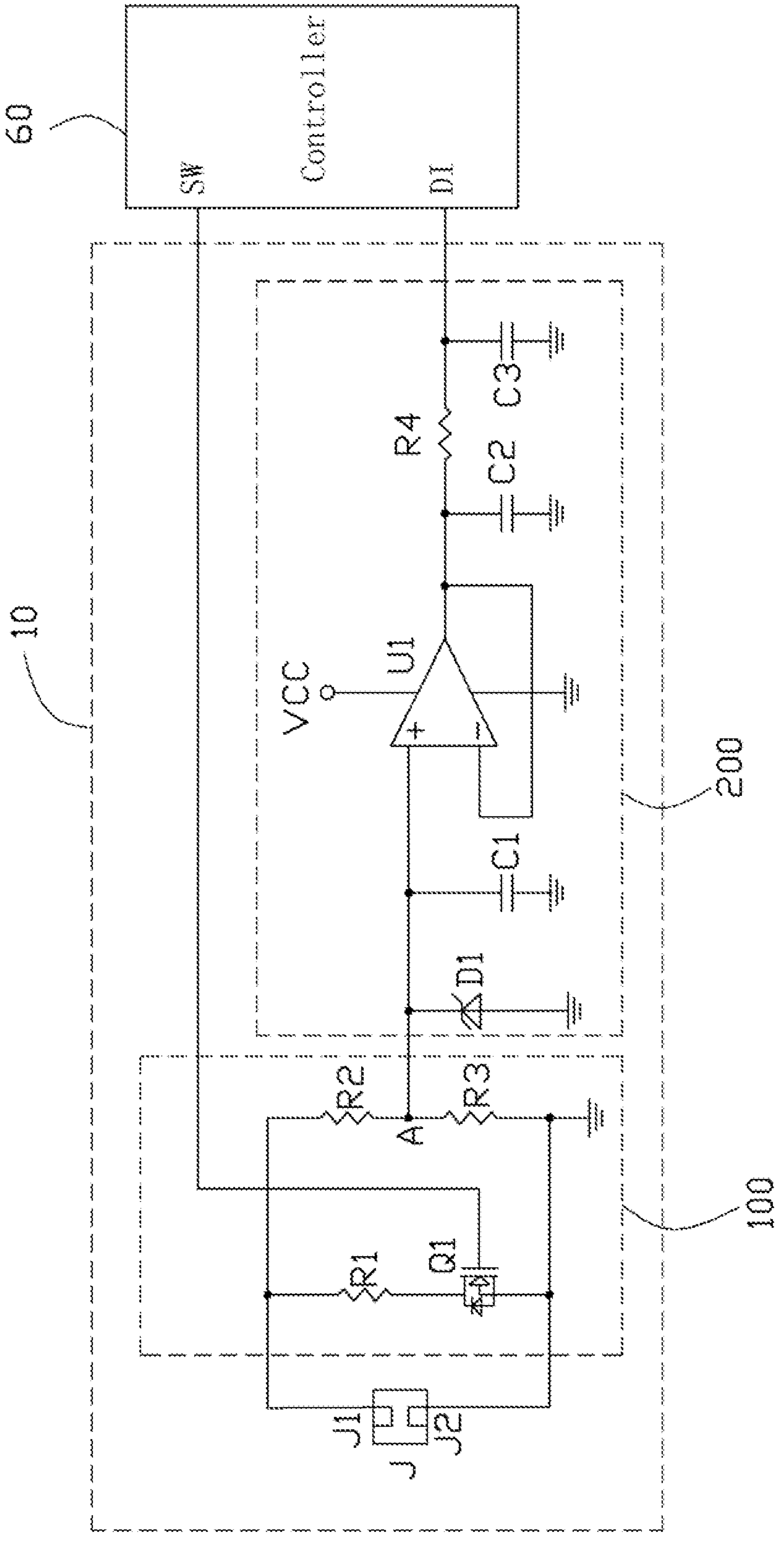
FIG. 2 is a schematic diagram of one of the input devices in FIG. 1.

Referring to FIG. 2, the input device 10 includes a switching circuit 100, an input circuit 200, and a connector J. The switching circuit 100 is connected between a control terminal SW of the controller 60 and the connector J. The input circuit 200 is connected between the switching circuit 100 and an input terminal DI of the controller 60. The connector J is connected to the first sensor 20 or the second sensor 30.

The switching circuit 100 receives the voltage signal of the first sensor 20 or the current signal of the second sensor 30 and outputs the first detection signal or the second detection signal. The input circuit 200 transmits the first detection signal or the second detection signal to the controller 60.

The controller 60 controls the status of the switching circuit 100 and receives the first detection signal and the second detection signal. When the input device 10 is connected to the first sensor 20, the controller 60 controls the switching circuit 100 to receive the voltage signal of the first sensor 20. At the same time, the controller 60 receives the first detection signal via the input circuit 200. When the input device 10 is connected to the second sensor 30, the controller 60 controls the switching circuit 100 to receive the current signal of the second sensor 30. At the same time, the controller 60 receives the second detection signal via the input circuit 200.

The controller 60 controls the first alarm 40 to work according to the first detection signal. The controller 60 controls the second alarm 50 to work according to the second detection signal. For example, the controller 60 controls the first alarm 40 to alarm when the controller 60 receives a first detection signal indicating that temperature is less than a predetermined value.

The switching circuit 100 includes a metal-oxide-semiconductor field effect transistor (MOSFET) Q1, and resistors R1~R3. The MOSFET Q1 is an n-channel MOSFET. The resistances of the resistors R2 and R3 are considerably larger than the resistance of the resistor R1. In one embodiment, the resistance of the resistor R1 is 750 ohms (Ω) and the resistances of the resistors R2 and R3 are both 300 kilohms (KΩ).

A drain of the MOSFET Q1 is connected to a first terminal J1 of the connector J via the resistor R1. A gate of the MOSFET Q1 is connected to the control terminal SW of the controller 60. A source of the MOSFET Q1 is grounded and connected to a second terminal J2 of the connector J. A first terminal of the resistor R3 is connected to the first terminal J1 of the connector J via the resistor R2. A second terminal of the resistor R3 is grounded.

The input circuit 200 includes a voltage stabilizing diode D1, an operational amplifier U1, a resistor R4, and capacitors C1~C3. The voltage stabilizing diode is a Zener diode.

A cathode of the voltage stabilizing diode D1 is connected to a node A between the resistors R2 and R3. An anode of the voltage stabilizing diode D1 is grounded.

A non-inverting input of the operational amplifier U1 is connected to the cathode of the voltage stabilizing diode D1, and grounded via the capacitor C1. An inverting input of the operational amplifier U1 is connected to an output of the operational amplifier U1. A power terminal of the operational amplifier U1 is connected to a power source VCC. A ground terminal of the operational amplifier U1 is grounded. The output of the operational amplifier U1 is also grounded via the capacitor C2.

A first terminal of the resistor R4 is connected to the output of the operational amplifier U1. A second terminal of the resistor R4 is connected to the input terminal DI of the controller 60 and grounded via the capacitor C3. The resistor R4 and the capacitors C2 and C3 compose a pi-type filter to filter high frequency signals from the output of the operational amplifier U1.

Figure 3:
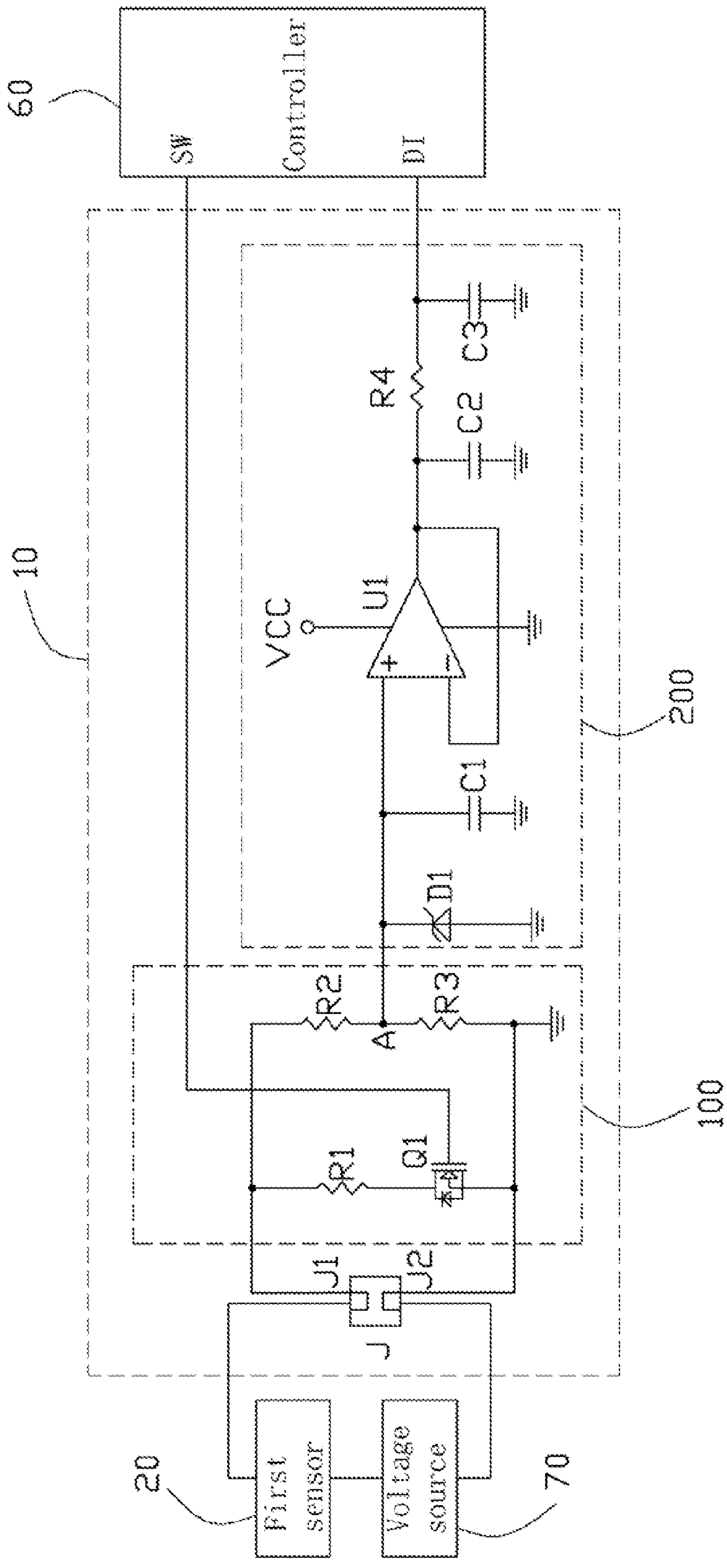
FIG. 3 is a schematic circuit diagram of one of the input devices of FIG. 2 connected to a first sensor.

Referring to FIG. 3, when the first terminal J1 of the connector J, the first sensor 20, a voltage source 70, and the second terminal J2 of the connector J are connected in series, the control terminal SW of the controller 60 is set at a low voltage level. The MOSFET Q1 of the switching circuit 100 is turned off. At this time, the resistor R2 and the resistor R3 are connected in series.

The first sensor 20 detects temperature. Voltage Vb of a node between the resistor R2 and the first terminal J1 of the connector J changes corresponding to changing temperature. The relationship of the voltage Vb of the node between the resistor R2 and the first terminal J1 of the connector J, the voltage Va of the node A, resistances of the resistors R2 and R3 is shown as below.

$$Va=Vb\times R3/(R2+R3)$$

The input terminal DI of the controller 60 receives the output of the operational amplifier U1 via the resistor R4. The output of the operational amplifier U1 is approximately equal to the input voltage Va. The controller 60 stores a plurality of voltage values and a plurality of corresponding temperature values. The controller 60 determines temperature of the first sensor 20 by comparing the input voltage Va with the temperature values.

Figure 4:
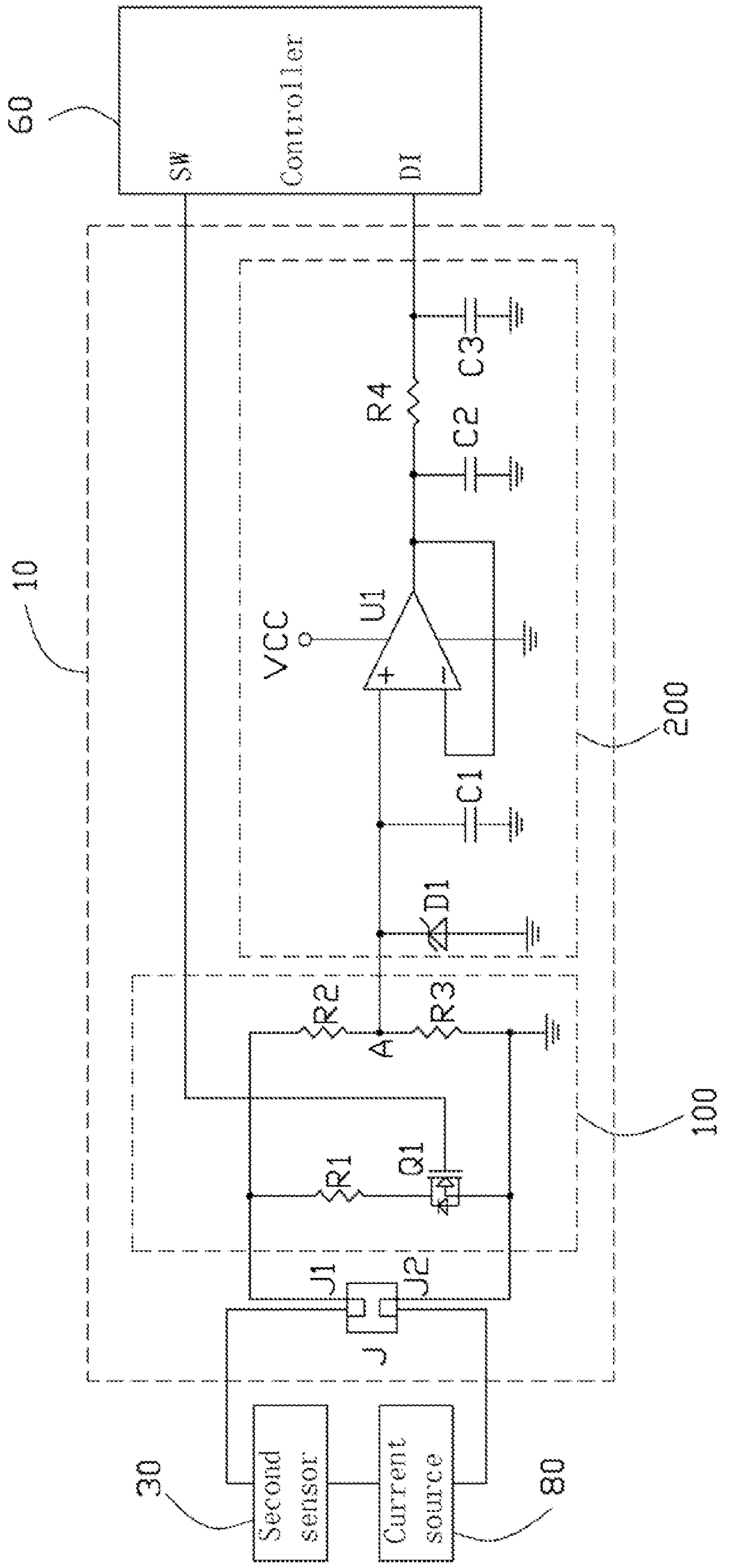
FIG. 4 is a schematic circuit diagram of one of the input devices of FIG. 2 connected to a second sensor.

Referring to FIG. 4, when the first terminal J1 of the connector J, the second sensor 30, a current source 80, and the second terminal J2 of the connector J are connected in series, the control terminal SW of the controller 60 is set at a high voltage level. The MOSFET Q1 of the switching circuit 100 is turned on. At this time, the resistor R1 is connected in parallel with the resistors R2 and R3.

The switching circuit 100 converts a current signal flowing through the resistor R1 to a voltage signal. The current flowing through the resistors R2 and R3 is negligible because the resistances of the resistors R2 and R3 are considerably larger than the resistance of the resistor R1. The second sensor 40 detects temperature, and the current flowing through the resistor R1 changes correspondingly to changing of temperature. The voltage across the resistor R1 changes and the voltages across the resistors R2 and R3 change correspondingly. The voltage across the resistor R1 can be obtained by detecting the voltage of the node A.

The input terminal D1 of the controller 60 receives the voltage signal of the node A via the operational amplifier U1 and the resistor R4. The controller 60 determines temperature according to the voltage signal of the node A.

The foregoing description of the exemplary embodiments of the disclosure has been presented only for the purposes of illustration and description and is not intended to be exhaustive or to limit the disclosure to the precise forms disclosed. Many modifications and variations are possible in light of the above everything. The embodiments were chosen and described in order to explain the principles of the disclosure and their practical application so as to enable others of ordinary skill in the art to utilize the disclosure and various embodiments and with various modifications as are suited to the particular use contemplated. Alternative embodiments will become apparent to those of ordinary skills in the art to which the present disclosure pertains without departing from its spirit and scope. Accordingly, the scope of the present disclosure is defined by the appended claims rather than the foregoing description and the exemplary embodiments described therein.

What is claimed is:

1. A monitoring system, comprising:

a controller comprising a plurality of input terminals, a plurality of output terminals, and a plurality of control terminals;

a plurality of first sensors;

a plurality of second sensors;

a plurality of input devices, wherein a sum of the plurality of first sensors and the plurality of second sensors is equal to a number of the plurality of input terminals of the controller, each input device is connected between an input terminal of the controller and one of the plurality of first sensors or one of the plurality of second sensors, each input device is also connected to a control terminal of the controller, each input device comprises a switching circuit, an input circuit, and a connector, the connector is connected to one of the plurality of first sensors and a voltage source in series or connected to one of the plurality of second sensors and a current source in series, wherein when an input device is connected to a first sensor, the switching circuit receives a voltage signal of the first sensor and sends out a first detection signal, the input circuit transmits the first detection signal to the controller; when the input device is connected to a second sensor, the switching circuit receives a current signal of the second sensor and sends out a second detection signal, the input circuit transmits the second detection signal to the controller;

a plurality of first alarms connected to the corresponding output terminals of the controller, wherein a number of the plurality of first alarms is equal to the number of the plurality of first sensors, the controller controls a first alarm according to the first detection signal; and a plurality of second alarms connected to the corresponding output terminals of the controller, wherein a number of the plurality of second alarms is equal to the number of the plurality of second sensors, the controller controls a second alarm according to the second detection signal.

2. The monitoring system of claim 1, wherein the plurality of first sensors and the plurality of second sensors are temperature sensors.

3. The monitoring system of claim 1, wherein the switching circuit comprises a metal-oxide-semiconductor field effect transistor (MOSFET), a first resistor, a second resistor, and a third resistor, a drain of the MOSFET is connected to a first terminal of the connector via the first resistor, a gate of the MOSFET is connected to the control terminal of the controller, a source of the MOSFET is grounded and connected to a second terminal of the connector, a first terminal of the third resistor is connected to the first terminal of the connector via the second resistor, a second terminal of the third resistor is grounded.

4. The monitoring system of claim 3, wherein the MOSFET is an n-channel MOSFET.

5. The monitoring system of claim 3, wherein the resistance of the first resistor is 750 ohms and the resistances of the second and the third resistor are both 300 kilohms

6. The monitoring system of claim 3, wherein the input circuit comprises a voltage stabilizing diode, an operational amplifier, and a fourth resistor, a cathode of the voltage stabilizing diode is connected to a node between the second resistor and the third resistor, an anode of the voltage stabilizing diode is grounded, a non-inverting input of the operational amplifier is connected to the cathode of the voltage stabilizing diode, an inverting input of the operational amplifier is connected to an output of the operational amplifier, a first terminal of the fourth resistor is connected to the output of the operational amplifier, a second terminal of the fourth resistor is connected to the input terminal of the controller.

7. An input device connected between a controller and a first sensor or a second sensor, the input device comprising:

a connector connected to the first sensor and a voltage source in series or connected to the second sensor and a current source in series;

a switching circuit connected between a control terminal of the controller and the connector, wherein when the connector is connected to the first sensor, the controller controls the switching circuit to receive a voltage signal of the first sensor and send out a first detection signal, when the connector is connected to the second sensor, the controller controls the switching circuit to receive a current signal of the second sensor and send out a second detection signal; and an input circuit connected between the switching circuit and an input terminal of the controller, wherein the input circuit transmits the first or second detection signal from the switching circuit to the controller.

8. The input device of claim 7, wherein the first sensor and the second sensor are temperature sensors.

9. The input device of claim 7, wherein the switching circuit comprises a metal-oxide-semiconductor field effect transistor (MOSFET), a first resistor, a second resistor, and a third resistor, a drain of the MOSFET is connected to a first terminal of the connector via the first resistor, a gate of the MOSFET is connected to the control terminal of the controller, a source of the MOSFET is grounded and connected to a second terminal of the connector, a first terminal of the third resistor is connected to the first terminal of the connector via the second resistor, a second terminal of the third resistor is grounded.

10. The input device of claim 9, wherein the MOSFET is an n-channel MOSFET.

11. The input device of claim 9, wherein the resistance of the first resistor is 750 ohms and the resistances of the second and the third resistor are both 300 kilohms

12. The input device of claim 9, wherein the input circuit comprises a voltage stabilizing diode, an operational amplifier, and a fourth resistor, a cathode of the voltage stabilizing diode is connected to a node between the second resistor and the third resistor, an anode of the voltage stabilizing diode is grounded, a non-inverting input of the operational amplifier is connected to the cathode of the voltage stabilizing diode, an inverting input of the operational amplifier is connected to an output of the operational amplifier, a first terminal of the fourth resistor is connected to the output of the operational amplifier, a second terminal of the fourth resistor is connected to the input terminal of the controller.

* * * * *